(12) United States Patent
Thyagarajan et al.

(10) Patent No.: US 11,987,711 B2
(45) Date of Patent: May 21, 2024

(54) PARTICLES WITH COLOR EFFECT AND COMPOSITIONS INCLUDING THE SAME

(71) Applicant: Palo Alto Research Center Incorporated, Palo Alto, CA (US)

(72) Inventors: Krishnan Thyagarajan, Mountain View, CA (US); Dogan Timucin, Santa Cruz, CA (US); Stephen Matthew Meckler, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 482 days.

(21) Appl. No.: 17/106,730

(22) Filed: Nov. 30, 2020

(65) Prior Publication Data
US 2022/0169860 A1   Jun. 2, 2022

(51) Int. Cl.
*C09C 1/00* (2006.01)
*C09C 1/36* (2006.01)
*G02B 5/22* (2006.01)

(52) U.S. Cl.
CPC .......... *C09C 1/0087* (2013.01); *C09C 1/3676* (2013.01); *G02B 5/223* (2013.01); *C01P 2004/62* (2013.01); *C01P 2004/64* (2013.01); *C01P 2006/22* (2013.01)

(58) Field of Classification Search
CPC .... C09C 1/0087; C09C 1/3676; C09D 1/3676
See application file for complete search history.

(56) References Cited

U.S. PATENT DOCUMENTS 9,547,107 B2   1/2017  Guo et al.
9,645,416 B2 * 5/2017  Blackman ............. C09C 1/3676
2009/0256116 A1 * 10/2009 Shumaker-Parry ..........
                                                        C09K 11/025
                                                        252/301.18

FOREIGN PATENT DOCUMENTS

CN        105259600        1/2016
CN        111122517 A  *   5/2020

OTHER PUBLICATIONS

Machine translation of CN 111122517 A, published May 8, 2020.*
Raziman et al., "Polarisation charges and scattering behaviour of realistically rounded plasmonic nanostructures," Optics Express, vol. 21, No. 18, Sep. 9, 2013, 8 pages.

* cited by examiner

*Primary Examiner* — Vickey Nerangis
(74) *Attorney, Agent, or Firm* — Mueting Raasch Group (57) ABSTRACT

A particle is provided that includes a first material and a second material, arranged to provide a Fano resonance effect, for example in the visible portion of electromagnetic spectrum. The first and second materials may be substantially clear in the visible portion of the electromagnetic spectrum. The first material may include an inorganic material, such as $SiO_2$, $TiO_2$, $HfO_2$, $ZrO_2$, diamond, or a combination thereof. The second material may include a polymer. The first material has a first refractive index and the second material has a second refractive index, where the first refractive index and second refractive index have a difference of 0.5 or greater, and 1.0 or less. The first material may form a core and the second material may form a shell surrounding the core. Alternatively, the first and second materials may form a Janus particle, an asymmetric dimer, or an aggregate.

15 Claims, 6 Drawing Sheets

PARTICLES WITH COLOR EFFECT AND COMPOSITIONS INCLUDING THE SAME

FIELD

The present disclosure relates to particles exhibiting a Fano resonance effect and to compositions including such particles. The present disclosure relates to particles exhibiting a color effect, and to compositions including such particles. The present disclosure further relates to particles exhibiting absorbance in the visible part of the electromagnetic spectrum and exhibiting little or negligible absorbance in the infrared part of the electromagnetic spectrum.

BACKGROUND

Radiative cooling is a form of cooling in which heat dissipation is achieved by way of radiating energy to the surroundings. All objects constantly emit and absorb energy and undergo cooling when the net energy flow is outward, or experience heat gain when the net energy flow is inward. For example, passive radiative cooling of buildings (e.g., radiative cooling achieved without consuming power to cool, such as by operating a cooling fan) typically occurs during the night when long-wave radiation from the sky absorbed by the building is less than the long-wave infrared radiation emitted by the building. Conversely, during the daytime, solar radiation reaching the building and being absorbed by it may be greater than the emitted long-wave infrared radiation, and thus there is a net flow into the building. Passive radiative cooling may be improved by using materials or coatings that increase the amount of energy emitted from a surface and/or reduce the amount of energy absorbed by the surface, where the surface may enclose the desired volume to be cooled. Such coatings include passive radiative cooling paints, also known as self-cooling paints. Some passive radiative cooling paints can achieve a cooling rate of up to 10° C. (18° F.) below the ambient air temperature. This may be accomplished by combining high solar reflectance with high IR emittance in the sky transparency window (e.g., 8 μm to 13 μm). Passive cooling may be done without the need for electricity or water, or complex structural features or cooling devices.

Currently available passive radiative cooling paints are white in color because the addition of a pigment or dye would cause the paint to absorb radiation and would thus interfere with the radiative cooling property of the paint.

Further improvements to color additives for radiative cooling materials are desired.

SUMMARY

According to embodiments, the present application relates to a particle comprising a first material and a second material, arranged to provide a Fano resonance effect in the visible portion of electromagnetic spectrum. According to a preferred embodiment, the first and second materials are substantially clear in the visible portion of the electromagnetic spectrum. The first material may include an inorganic material. The first material may include a mineral, such as $SiO_2$, $TiO_2$, $HfO_2$, $ZrO_2$, diamond, or a combination thereof. The second material may include a polymer. The first material has a first refractive index and the second material has a second refractive index, where the first refractive index and second refractive index have a difference of 0.5 or greater. The first refractive index and second refractive index may have a difference of 1.0 or less. The first material may form a core and the second material may form a shell surrounding the core. Alternatively, the first and second materials may form a Janus particle, an asymmetric dimer, or an aggregate, including a first portion made up of the first material and a second portion made up of the second material.

According to an embodiment, the particles of the present application may be used in a paint. For example, the particles of the present application may be included in a paint, such as a radiative cooling paint, to provide a color effect. The paint may include a medium and a plurality of the particles dispersed in the medium. The paint may be a radiative cooling paint capable of transmitting and emitting radiation at least in a wavelength window of 8 μm to 13 μm.

According to an embodiment, a method of making a particle exhibiting Fano resonance effect in visible and infrared portions of electromagnetic spectrum includes applying a polymer layer onto a nanoparticle core. Applying the polymer layer may include coating a surface of the nanoparticle core with a monomer or initiator and initiating polymerization from the monomer or initiator. Applying the polymer layer may include adsorption of at least a portion of the polymer onto the nanoparticle core. Applying the polymer layer may include a chemical reaction with a surface of the nanoparticle core. Applying the polymer layer may include using a molecular deposition technique.

DEFINITIONS

All scientific and technical terms used herein have meanings commonly used in the art unless otherwise specified. The definitions provided herein are to facilitate understanding of certain terms used frequently herein and are not meant to limit the scope of the present disclosure.

The term "Fano resonance effect" is used here to refer to a classical resonant optical phenomenon that occurs when a sharp and discrete optical resonance overlaps with a broad coherent background spectrum, giving rise to an asymmetric line-shape in the optical absorption/emission properties. It is the classical analogue of the well-known Fano effect in quantum physics, where a quantum state interferes with a continuum band of states, leading to an asymmetric absorption spectrum.

The term "clear" in the context of electromagnetic radiation is used here to refer to the property of not modifying the optical properties of the portion of interest of the electromagnetic spectrum via light-matter interaction. For example, a material that is clear in the visible portion of the electromagnetic spectrum does not exhibit color or impart any additional color to an underlying material. The term "clear" describes an inherent property of the material. Materials that appear clear (e.g., are substantially clear) may exhibit a small but nonzero absorption of light, quantified by the absorption coefficient α (in units of 1/m). Clear materials have a product of α and material thickness t (in m) that is small, for example less than $10^{-2}$, less than $10^{-3}$, less than $5 \times 10^{-3}$, or less than $10^{-4}$. For the purpose of this calculation, a material thickness of 1 μm may be used (for example, the constituent material of the core or the shell).

The term "visible portion of the electromagnetic spectrum" is used here to refer to wavelengths visible to the human eye, ranging between 400 nm to 800 nm.

The term "IR portion" of the electromagnetic spectrum is used here to refer to wavelengths longer than the visible portion. The IR portion includes wavelengths of 0.8 µm to 25 µm.

The term "Janus particle" is used here to refer to a particle made up of two different materials having different physical or chemical properties, where both materials are present on the surface of the particle and make up a distinct portion of the surface. An example of a Janus particle is a particle with one half made of a first material and another half made of a second material having different physical or chemical properties than the first material.

The term "cross-sectional half-dimension" is used here to refer to a dimension of a particle (e.g., a non-spherical particle) that is analogous to the radius of a sphere. When particle radius is discussed here, the term radius is intended to refer to either radius or cross-sectional half-dimension, which ever applies to the particle in question. The cross-sectional half-dimension can be calculated by determining $L_X$, $L_Y$, and $L_Z$, as the largest linear dimensions of the particle along x, y, and z axes, respectively. The x-axis may be defined as being oriented along the largest linear dimension of the particle. The y-axis may be defined as being oriented along the largest linear dimension in the plane transverse to the x-axis. This also fixes the z-axis according to the right-hand rule. Then, the cross-sectional half-dimension can be defined as the geometric mean R=cube-root $[(L_X*L_Y*L_Z)/8]$.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries, as well as linear polymers, branched polymers, dendrimers, and bottle-brush configurations.

The term "substantially" as used here has the same meaning as "significantly," and can be understood to modify the term that follows by at least about 90%, at least about 95%, or at least about 98%. The term "substantially free" of a particular compound means that the compositions of the present invention contain less than 1,000 parts per million (ppm) of the recited compound. The term "essentially free" of a particular compound means that the compositions of the present invention contain less than 100 parts per million (ppm) of the recited compound. The term "completely free" of a particular compound means that the compositions of the present invention contain less than 20 parts per billion (ppb) of the recited compound. In the context of the aforementioned phrases, the compositions of the present invention contain less than the aforementioned amount of the compound whether the compound itself is present in unreacted form or has been reacted with one or more other materials.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have", "having", "include", "including", "comprise", "comprising" or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to particles exhibiting a Fano resonance effect and to compositions including such particles. The present disclosure relates to particles exhibiting a color effect, and to compositions including such particles. The present disclosure relates to particles exhibiting absorbance and/or reflectance and/or transmittance in one narrow band of the electromagnetic spectrum and exhibiting little or negligible absorbance in other parts of the electromagnetic spectrum. In particular, the present disclosure relates to particles exhibiting absorbance in the visible part of the electromagnetic spectrum and exhibiting little or negligible absorbance in the infrared and ultraviolet part of the electromagnetic spectrum. The present disclosure further relates to paints, coatings, and other materials containing such particles.

Typical passive radiative cooling paints are white in color. Adding a typical paint pigment would cause the paint to absorb radiation and would thus interfere with the radiative cooling property of the paint. In order to reflect or transmit light in a specific wavelength region to be perceived as a color, pigments absorb light at the other visible wavelengths. This can be problematic particularly with radiative cooling paints, which are aimed at reducing absorption. The present disclosure provides a particle (e.g., a plurality of particles or a metafluid) that, when mixed with a radiative cooling paint, allows for coloration of the paint with a desired color of choice, with reduced radiation absorption compared to the use of pigments or dyes. The particles of the present disclosure may be added to the paint itself, or may be added as a separate layer to an item painted with radiative cooling paint. For example, the particles may be assembled on a conformal surface via solution processing or nano imprint lithography to create a film containing the particles. The film may be used as a colored filter that may be pasted on top of an article painted with radiative cooling paint. The particles of the present disclosure provide a visible color effect, preferably without substantially impacting the radiative cooling effect of the paint.

Although the particles of the present disclosure are made of materials that do not exhibit a color (e.g., are clear in the visible portion of the electromagnetic spectrum), the engineered particle as a whole exhibits a visible color effect without significant absorption in the infrared part of the spectrum due to the Fano resonance effect. When particles exhibiting Fano resonance effect are excited with light, energy transfer between a dark mode and a bright mode permits a narrow absorption of energy, thus affecting the transmitted/reflected light. The particles may be engineered to provide a desired color effect by selection of the dimensions and configurations of the particle and the materials within the particle. The absorption peak of the particles in the visible portion of the electromagnetic spectrum can be as narrow as 5 nm, 10 nm, or 20 nm (full width at half maximum), and the color may be tunable across the entire visible spectrum from 400 nm to 800 nm. The full width at half maximum may be 5 nm or greater or 10 nm or greater. The full width at half maximum may be 20 nm or less, or 15 nm or less. The full width at half maximum may range from 5 nm to 20 nm.

In some embodiments, the particles exhibit the Fano resonance effect in another part of the electromagnetic spectrum. That is, the particles may exhibit the Fano resonance effect in the infrared part or ultraviolet part or the electromagnetic spectrum.

According to an embodiment, each particle includes a first material and a second material, arranged to provide a Fano resonance effect in visible portion of electromagnetic spectrum. In a preferred embodiment, the first and second materials are substantially clear at least in the visible ("VIS") portion of the electromagnetic spectrum. Preferably the first and second materials are substantially clear in the IR portion of the electromagnetic spectrum. The first and second materials may also be substantially clear in the UV portion of the electromagnetic spectrum. In some embodiments, the first and second materials are substantially clear in the visible ("VIS"), IR, and UV portions of the electromagnetic spectrum. In some embodiments, one or both of the first and second materials are not clear or not substantially clear in the visible ("VIS"), IR, and UV bands of the electromagnetic spectrum. An acceptable amount of transmission loss (compared to a clear material) may be, for example, 70% or less, 60% or less, 50% or less, 40% or less, 30% or less, 20% or less, or 10% or less. The transmission loss may be 0% or greater, 5% or greater, or 10% or greater. In other words, the materials may absorb or reflect up to 10%, up to 20%, up to 30%, up to 40%, up to 50%, up to 60%, or up to 70% of light. According to an embodiment, the particle is substantially clear in IR portion of the electromagnetic spectrum or emits only in a wavelength range of 8 μm to 13 μm and is substantially clear in other parts of the IR portion. According to an embodiment, the first and second materials are selected such that they exhibit a suitable refractive index difference that results in the desired Fano resonance effect. The VIS response of the particle is due to the Mie resonances, and because the materials themselves do not have resonance in this part of the spectrum, the color effect is purely structural. That is, the color effect is a result of the constituents and configuration of the particles. The ability to control VIS reflection and transmission and have minimal effect in the NIR absorption in the Fano particle layer permits rendering a color effect while preventing additional solar absorption. The perceived color is a function of the materials and their refractive index difference, as well as the size of the particle and its core and their relative arrangement. This permits precise tuning of the color effect by selection of materials and the proportions of the particle.

The Fano resonance effect is achieved by selecting materials with a sufficiently large refractive index difference. For example, the first material may be selected to have a first refractive index and the second material may be selected to have a second refractive index, where the first refractive index and second refractive index have a difference of 0.5 or greater, 0.6 or greater, 0.7 or greater, or 0.8 or greater. The difference between the first refractive index and second refractive index may be 1.3 or less, 1.2 or less, 1.1 or less, 1.0 or less, or 0.9 or less. In some cases, the difference between the first refractive index and second refractive index is between 0.5 and 1.0. Suitable material combinations include generally a material (e.g., the first material) with a relatively high refractive index and a material (e.g., the second material) with a relatively low refractive index, where both materials are substantially clear in the visible portion of the electromagnetic spectrum.

According to an embodiment, the first material is an inorganic material. For example, the first material may be a transparent oxide or mineral. In some embodiments, the first material is $SiO_2$, $TiO_2$, $HfO_2$, $ZrO_2$, diamond, or a combination thereof. Such materials tend to have a relatively high refractive index, suitable for forming a combination of materials with a refractive index difference of 0.5 or greater. Preferably the first material has a refractive index of 1.5 or greater, 1.8 or greater, or 2 or greater.

According to an embodiment, the second material is or includes a polymer. The type of polymer that may be selected is not particularly limited. Preferably the polymer is substantially clear in the visible portion of the electromagnetic spectrum and has a suitably low refractive index such that the combination of first and second materials have a refractive index difference of 0.5 or greater. Preferably the second material has a refractive index of 2 or lower, 1.8 or lower, or 1.6 or lower. In some cases, the second material has a refractive index of about 1.3 to 1.6. Examples of suitable polymers include styrenic polymers, polyacrylates and polymethacrylates (e.g., polymethylmethacrylates, polymethylacrylates, poly(1,1,1,3,3,3-hexafluoroisopropyl acrylates), poly(2,2,2-trifluoroethyl methacrylates), poly(3,3,4,4,5,5,6,6,7,7,8,8,9,9,10,10,10-heptadecafluorodecyl methacrylates)), polydimethylsiloxanes, vinyl polymers, fluoropolymers, polyethylenes, polypropylenes, polyacrylamides, polytetrafluoroethylenes, polyvinylidene fluorides, polyamides, and combinations thereof.

In some embodiments, the first material, the second material, or both the first material and the second material is or includes a dielectric material, metal, organic compound, organometallic material, biological material, silicon, or a combination thereof.

The particles may be formed in various different ways, as long as the first and second materials are in close proximity such that the particle as a whole exhibits the Fano resonance effect. For example, the particles may be core-shell particles, Janus particles, asymmetric dimers, or aggregates. Schematic depictions of a core-shell particle, a Janus particle, an asymmetric dimer, and an aggregate are shown in FIGS. 1A-1D, respectively.

In one embodiment, the particle is a core-shell particle, where the first material forms the core and the second material forms the shell. In another embodiment, the second material forms the core and the first material forms the shell. Due to ease of manufacturing, in a preferred embodiment the first material forms the core and the second material forms the shell.

Figure 1A:
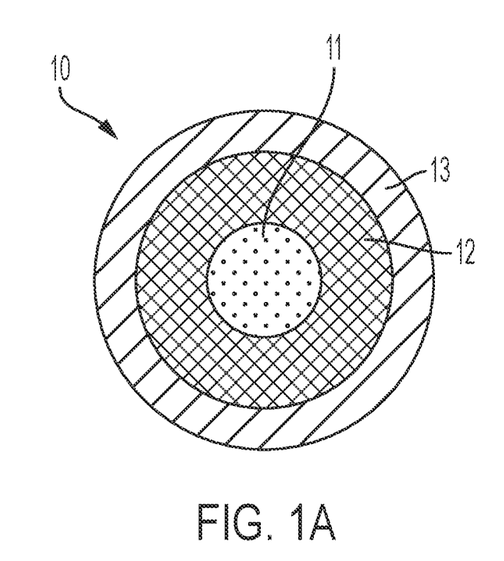
FIGS. 1A-1D are schematic depictions of a core-shell particle, a Janus particle, an asymmetric dimer, and an aggregate, respectively.

An example of a core-shell particle 10 is shown in FIG. 1A. The particle 10 includes a core 11 and a shell 12 enclosing the core 11. The core 11 may be made of the first material and the shell 12 may be made of the second material. In some embodiments, the core 11 is made of the second material and the shell 12 is made of the first material. The core-shell particle 10 may further include additional layers, such as an outer polymer layer 13, as shown in FIG. 1A. The optional outer polymer layer 13 may be used to help dispersion of the particles in a medium, such as an organic solvent or aqueous paint medium. The material of the outer polymer layer 13 may be selected accordingly to impart desired dispersibility properties (e.g., hydrophobicity or hydrophilicity) to the particle 10. However, the material of the outer polymer layer 13 should be selected such that it does not significantly affect the absorption properties or the Fano resonance effect of the particle. The core 11 may be spherical or substantially spherical. In some embodiments, the core 11 may be a cuboid, a rounded cuboid, or other multifaceted shape (optionally rounded). According to an embodiment, the core is a nanoparticle, having a radius in the range of 20 nm to 200 nm, or from 40 nm to 125 nm.

In the case of Janus particles, asymmetric dimers, and aggregates, the first material may form one portion of the particle and the second material may form another portion of the particle that is adjacent the first material portion.

Figure 1B:
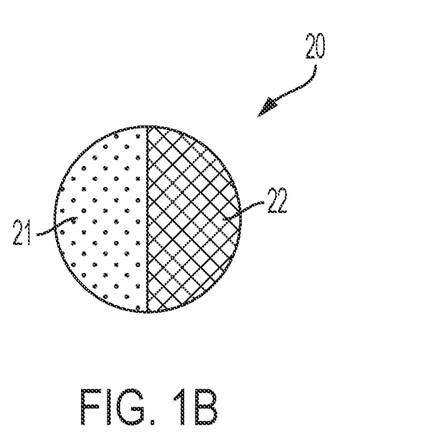

A Janus particle 20, shown in FIG. 1B, may be a particle where one half or portion 21 of the particle is made of the first material and the other half or portion 22 is made of the second material. The portions 21, 22 may be the same size (e.g., may be halves of the particle), or may be different sizes. In an alternative embodiment, the Janus particle may have a core made of the first material and a partial coating of the second material arranged on the core. The Janus particle may be spherical or substantially spherical. In some embodiments, one or both of the portions, 21, 22 may be a rounded cuboid. According to an embodiment, the Janus particle 20 is a nanoparticle, having a radius in the range of 20 nm to 200 nm, or from 40 nm to 125 nm.

Figure 1C:
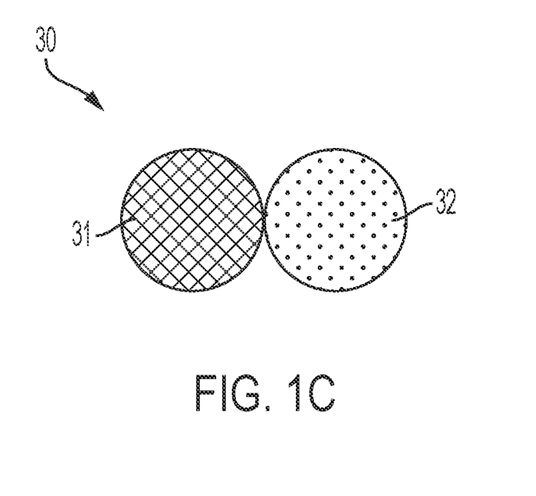

Asymmetric dimers 30, shown in FIG. 1C, may be made up of two portions 31, 32, where the portions are arranged side by side. One or both portions may be spherical or substantially spherical. Alternatively, one or both portions may be non-spherical. The first portion 31 may be made of the first material and second portion 32 may be made of the second material. The two portions may be equal or substantially equal in size. The two portions may be unequal in size. For example, the first portion 21 may be 10 to 80% larger in size (e.g., diameter) than the second portion 32. According to an embodiment, each portion may be a nanoparticle, having a radius in the range of 20 nm to 200 nm, or from 40 nm to 125 nm.

Figure 1D:
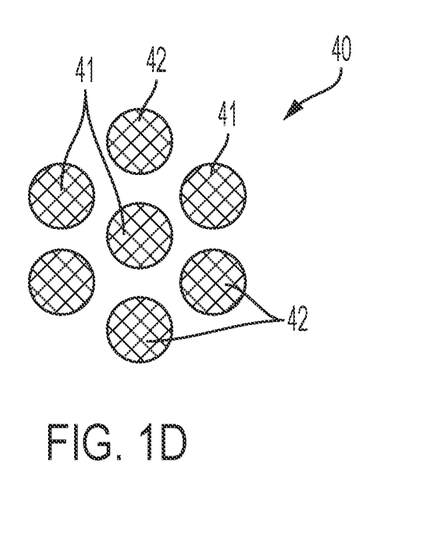

An aggregate 40, shown in FIG. 1D, may be formed of a plurality of particles. The Fano resonance effect produced by the aggregate 40 may be tuned based on one or more variables, such as the spatial arrangement of the particles in the aggregate (including spacing from one another and orientation of particles), the material(s) of the particles, the dimensions of the particles, the size and relative proportions of the particles, density of aggregates, altering the medium in which these aggregates may be embedded, adjusting the linkers that bind the aggregates together, etc. In one embodiment, the aggregate 40 contains particles of two or more different materials. For example, the aggregate 40 may contain a first portion 41 of the particles made up of the first material and a second portion 42 of the particles made up of the second material. In another embodiment, the aggregate 40 contains particles made of the same material, where the Fano resonance effect is achieved by one of the other variables listed above, such as dimensions of the particles, the size and relative proportions of the particles, density of aggregates, altering the medium in which these aggregates may be embedded, adjusting the linkers that bind the aggregates together, etc. In one embodiment, the aggregate 40 includes particles having a radius in the range of 20 nm to 200 nm, or from 40 nm to 125 nm. The aggregate 40 may include particles of two or more particle populations, each particle population having a different average radius. For example, the aggregate 40 may include a first population of particles having a radius in a first range and a second population of particles having a radius in a second range, where the radius of the second population is greater than the first population. The aggregate may be held together by physical forces, such as van der Waals forces or capillary forces. The aggregate 40 may be formed by applying the particles onto a surface or substrate. For example, particles may be applied onto a surface or substrate by printing, lithographic techniques, or deposition. The size of the aggregate 40 may vary widely. The aggregate 40 may be from 0.001 mm to 2 mm in size. The particles or portions that form the aggregate 40 may be spherical or substantially spherical.

According to an embodiment, the color effect of the particle may be adjusted by adjusting the size of the core or the shell or both. For example, selecting a greater core size will move the peak in the scattering cross section (e.g., the apparent color effect) toward a higher wavelength. On the other hand, by increasing the shell radius, the absorption cross section in the NIR region may be reduced. In contrast, decreasing the shell radius increases color selectivity. According to a preferred embodiment, the fraction of NIR-absorbing material in the particle is minimized while still achieving the desired color effect (peak wavelength and spectral width or selectivity). The dimensions of the particle, such as the radius of the core and shell, may be balanced against this goal. The core may have a radius of 20 nm or greater, 40 nm or greater, 60 nm or greater, 80 nm or greater, or 100 nm or greater. The radius may be 200 nm or less, 175 nm or less, 150 nm or less, or 125 nm or less. In some cases, the core has a radius of 20 nm to 200 nm, or from 40 nm to 125 nm. The shell may have a thickness of 20 nm or greater, 40 nm or greater, 60 nm or greater, 80 nm or greater, or 100 nm or greater. The thickness of the shell may be 300 nm or less, 250 nm or less, 175 nm or less, 150 nm or less, or 125 nm or less. In some cases, the shell has a thickness of 20 nm to 200 nm, or from 100 nm to 150 nm. The particle as a whole (including core and shell) may have a radius of 40 nm or greater, 60 nm or greater, 80 nm or greater, 100 nm or greater, 120 nm or greater, or 150 nm or greater. The radius of the particle as a whole (including core and shell) may be 500 nm or less, 400 nm or less, 300 nm or less, or 250 nm or less. In some cases, the particle as a whole (including core and shell) has a radius of 40 nm to 500 nm, or from 60 nm to 250 nm.

The particles may be formed by any suitable method. In some embodiments, the particle is formed by applying a second material onto the first material, or by applying a first material onto the second material. The first or second material may be applied using any suitable technique, such as polymer grafting or a molecular deposition technique. In some embodiments, the particle is formed by applying a second material by grafting a polymer to or grafting from the first material (e.g., $SiO_2$, $TiO_2$, $HfO_2$, $ZrO_2$, diamond, or a combination thereof). The application may include applying a monomer, an oligomer, a polymer, or an initiator to the surface of the nanoparticle core. The application may further include application of a polymer onto the first applied substance. For example, the polymer may be applied by grafting from the first applied substance, or by grafting a polymer to the surface. The application may include coating the surface of the nanoparticle core with a monomer or initiator and initiating polymerization from the monomer or initiator. The application may include a chemical reaction with a surface of the nanoparticle core, and subsequent polymerization. The application may include adsorption of at least a portion of a polymer onto the nanoparticle core, and optionally subsequent polymerization. The polymerization may include a living polymerization. Examples of living polymerization include living anionic polymerizations, living cationic polymerizations, living ring-opening metathesis polymerizations, living radical polymerizations, and living chain-growth polycondensations. The polymerization may include atom transfer radical polymerization (ATRP), including activators regenerated by electron transfer ATRP, initiators for continuous activator regeneration ATRP, electrochemical ATRP, metal-free ATRP, or activators generated by electron transfer ATRP. The polymerization may include a controlled polymerization. The polymerization may include the use of a chain transfer agent, for example in a reversible addition-fragmentation chain-transfer polymerization. The polymerization may include a controlled radical polymerization. The polymerization may include stable free radical polymerization. The use of living and controlled polymerizations is preferred for enhanced control over polymer molecular weight, shell size, and polymer polydispersity index. The polymerization may include linear polymerization. The polymerization may include use of crosslinkers. The polymerization may form a bottle-brush polymer, dendrimer, or network polymer. The polymerization may be initiated with heat or with UV radiation. According to an embodiment, a surface-initiated nitroxide-mediated polymerization (SI-NMP) is used to graft a polymer shell from an inorganic core. In one version of this embodiment, the inorganic core is a nanoparticle, such as a $ZrO_2$ nanoparticle. A silane coupling agent, such as 3-(trimethoxysilyl)propyl methacrylate (TSPMA), may be chemically attached to the nanoparticle surface through the trimethoxysilyl group to create a surface-functionalized nanoparticle. The TSPMA may be chemically attached in the presence of a radical initiator, such as 2,2'-azobis(isobutyronitrile) (AIBN), a nitroxide mediator, such as 2,2,6,6-tetramethylpiperidin-1-yl)oxyl (TEMPO), or both. The surface functionalized nanoparticle may be reacted with a monomer, such as styrene or 1,1,1,3,3,3-hexafluoroisopropyl acrylate. The surface functionalized nanoparticle may be reacted with the monomer in the presence of an initiator, nitroxide mediator, or both. The surface functionalized nanoparticle may be reacted with the monomer at an elevated temperature for a prescribed time, such as between 10 seconds and 1 week. After the prescribed time, the reaction temperature is lowered below a temperature at which the polymerization reaction rate is significantly reduced. Longer prescribed times lead to larger polymer shells. According to an embodiment, the shell thickness is controlled by stopping the polymerization reaction. Any known method for stopping the polymerization reaction may be used, such as using end-group functionalization, radical quenching, scavenging termination, or a combination of these. In another example, a change in reaction temperature is used to stop the polymerization reaction. In some embodiments, the polymerization reaction is stopped when the shell has a thickness ranging from 20 nm to 200 nm, or from 100 nm to 150 nm. The polymerization reaction may be stopped when the polymer has a weight average molecular weight of 500 Da to 5,000,000 Da. In some embodiments, the polydispersity index of the polymer is low, such as less than 1.2, less than 1.5, less than 1.6, less than 2, or less than 3. A lower polydispersity index creates a more well-defined polymer shell exterior.

The method may further include designing the particle surface to enhance dispersion of the particles in a medium. In one embodiment, this is done through the selection of the shell material of a core-shell particle. In one embodiment, an outer polymer layer is applied onto the particle. The medium may be or may include an organic solvent, an aqueous medium, or a combination thereof. In cases where the particle is intended for use in an aqueous paint medium, the outer polymer layer may include a hydrophilic polymer such as polyacrylamide. In cases where the shell includes a polymer with a low surface energy, such as a fluoropolymer, a hydrophobic outer layer (e.g., polymethylmethacrylate ("PMMA") and the like) may be used for better dispersion in an organic solvent. The outer polymer layer may be used to prevent the medium from penetrating the shell, for example if the outer polymer layer is a network polymer.

In some embodiments, the second material is applied onto the first material or the first material is applied onto the second material by using a deposition technique and subsequently patterning the material. Deposition techniques may be used to apply oxides or minerals, such as $SiO_2$, $TiO_2$, $HfO_2$, $ZrO_2$, diamond, or a combination thereof, onto a particle. Examples of suitable patterning techniques include focused ion beam lithography and electron beam lithography.

According to an embodiment, the particles may be used in a paint. For example, the particles may be included in a paint, such as a radiative cooling paint, to provide a color effect due the Fano resonance effect. The particles may be particularly suitable for use in radiative cooling paints, where the use of other common pigments is limited due to their detrimental effect on the cooling effect of the paint. According to an embodiment, the paint may include a medium and a plurality of the particles dispersed in the medium. The paint may be a radiative cooling paint capable of transmitting and emitting radiation in a wavelength window of 8 μm to 13 μm. The paint medium may be any typical paint medium, e.g., a radiative cooling paint medium. The paint medium may include a pigment or dye. In some embodiments, the paint medium is free of pigments and dyes. Typical paint mediums include a polymeric substance dispersed in a solvent. Exemplary radiative cooling paints are described in US20200095429A1, incorporated here in its entirety. In some embodiments, a difference in refractive index between surface of the particles and the medium is greater than 0.5%, greater than 0.05%, or greater than 0.005%. The difference in refractive index between the surface of the particles and the medium retains the Fano resonance effect of the particles in the paint medium. In some embodiments, the particles make up less than 0.1%, less than 1%, less than 5%, less than 10%, less than 50%, or less than 90% of the paint, on a dry weight (non-volatile) basis.

In one embodiment, the particle is a core-shell particle having a core made from $SiO_2$, $TiO_2$, $HfO_2$, $ZrO_2$, diamond, or a combination thereof and a shell made from a polymer, such as polyacrylates, polymethylmethacrylates, polymethylacrylates, polydimethylsiloxanes, poly(1,1,1,3,3,3-hexafluoroisopropyl acrylates), poly(2,2,2-trifluoroethyl methacrylates), polydimethylsiloxanes, vinyl polymers, acrylate polymers, styrenic polymers, methacrylate polymers, fluoropolymers, polyethylenes, polypropylenes, polyacrylamides, polytetrafluoroethylenes, polyvinylidene fluorides, poly(3,3,4,4,5,5,6,6,7,7,8,8,9,9,10,10,10-heptadecafluorodecyl methacrylates), polyamides, or a combination thereof. In one embodiment, the particle is a core-shell particle having a core made from $SiO_2$ and a shell made from polymethylmethacrylate. In one embodiment, the particle is a core-shell particle having a core made from $TiO_2$ and a shell made from polymethylmethacrylate. The core may be a nanoparticle having a radius in the range of 20 nm to 200 nm, or from 40 nm to 125 nm. The shell may have a thickness of 20 nm to 200 nm, or from 100 nm to 150 nm. In one embodiment, the particle is used with a radiative cooling paint. For example, the particle may be an additive mixed into the radiative cooling paint.

EXAMPLES

Example 1

The color effect of various particles exhibiting Fano resonance effect was simulated using an extension of Mie theory as implemented in Wolfram Mathematica. Specifically, the VIS scattering and NIR absorption of core-shell Fano particles with 75 nm core radius and 100 nm total radius (i.e., 25 nm shell thickness) was simulated. Both cross-sections were normalized by the geometric cross-section of the particle. The core materials used in the simulation included $TiO_2$ and $SiO_2$. The shell material was polymethylmethacrylate ("PMMA").

Figure 2A:
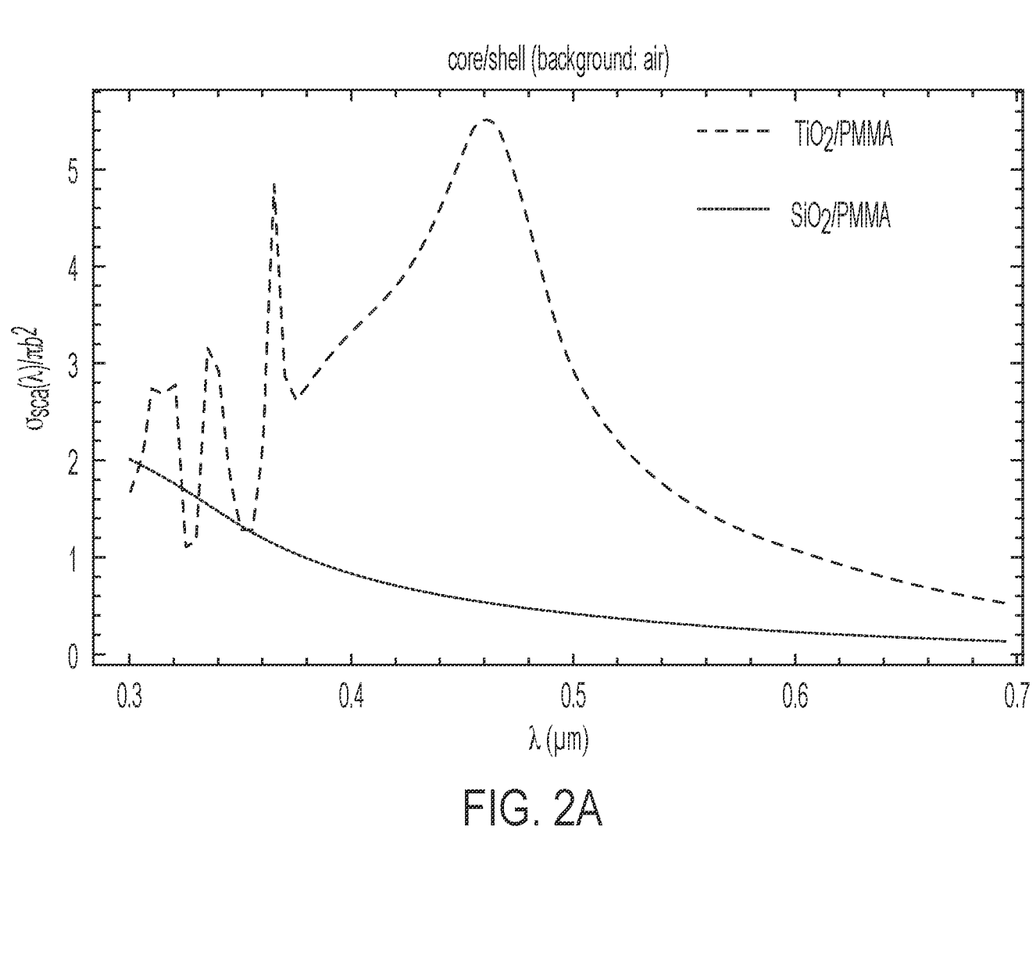
FIGS. 2A and 2B show results from Example 1.
Figure 2B:
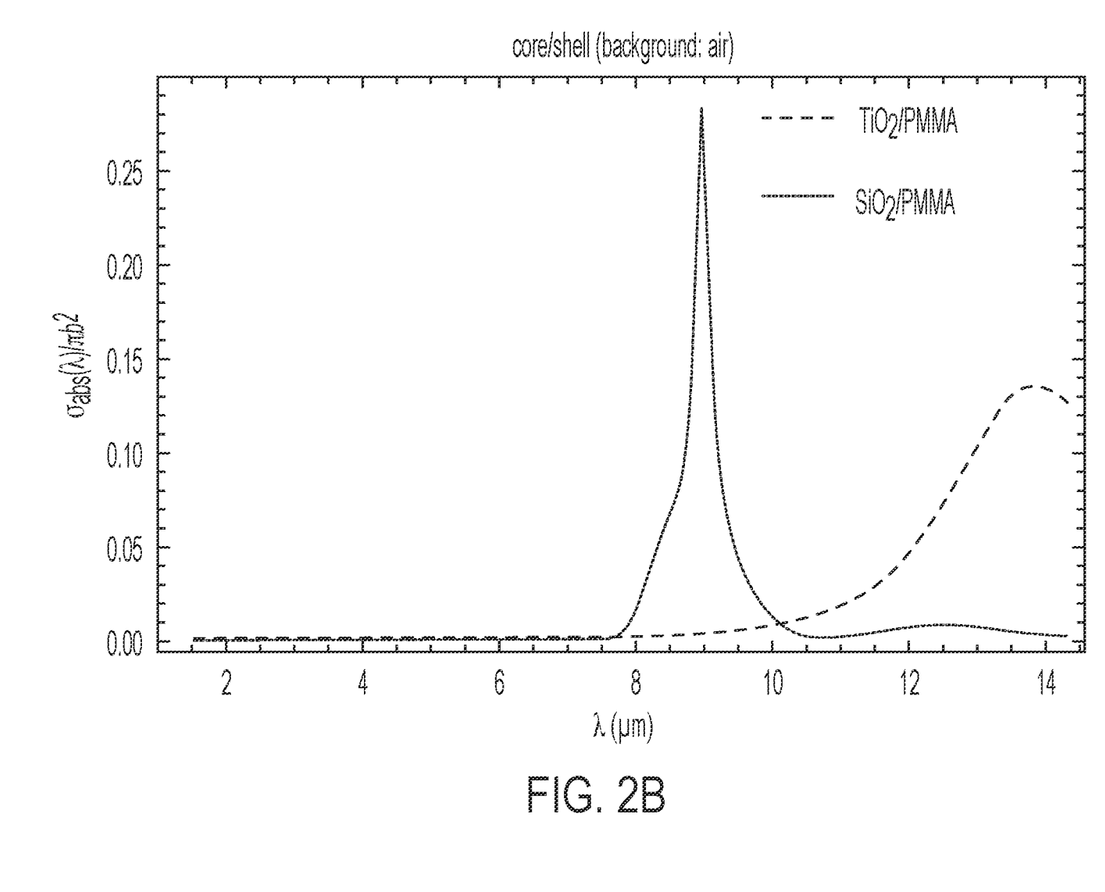

The cross section spectra in the VIS and NIR/IR regions are shown in FIGS. 2A and 2B, respectively. It was observed that, for example, the $TiO_2$/PMMA particle configuration gives color in the visible range while having negligible absorption in the IR range. It was concluded that the control of VIS and NIR parameters can allow color rendering while minimizing absorption of solar spectrum in the NIR.

Example 2

The impact of core size and shell thickness on the color effect of a particle exhibiting Fano resonance effect was simulated using Mathematica. The core materials used in the simulation included $TiO_2$ and the shell material was polymethylmethacrylate ("PMMA").

Figure 3A:
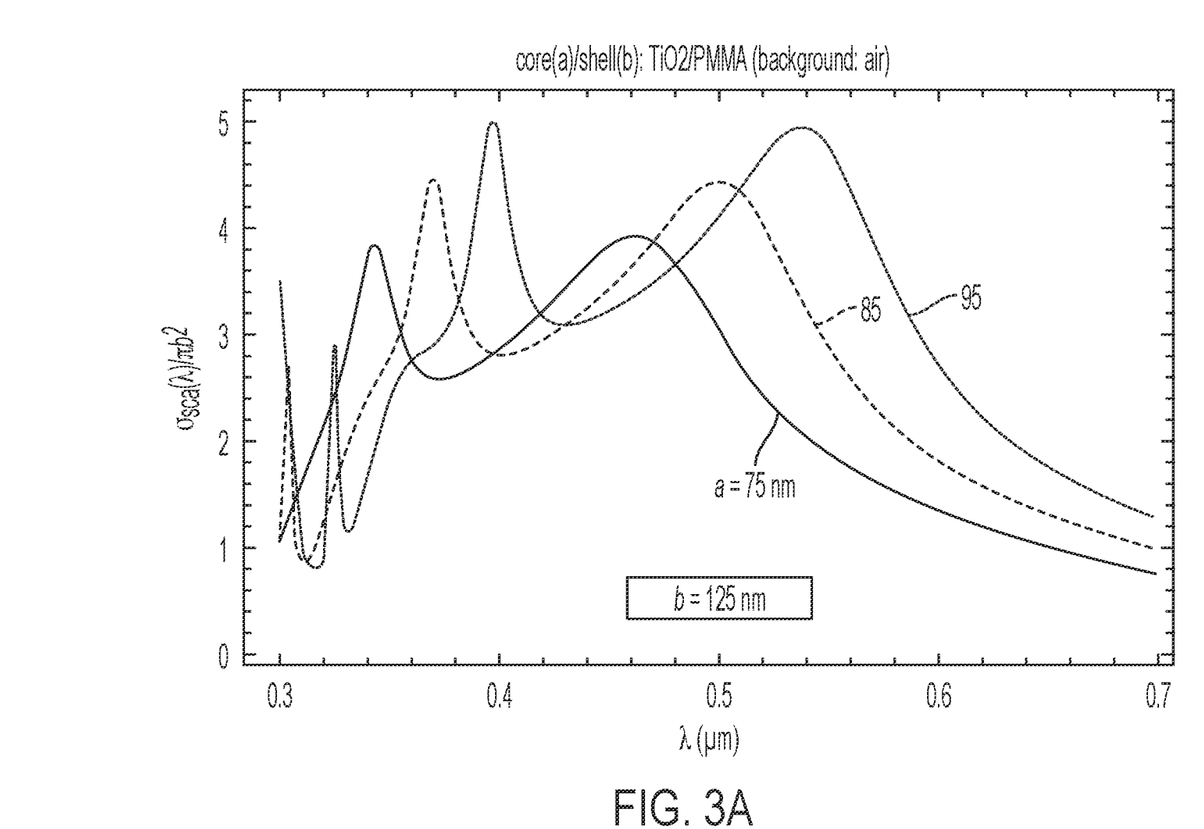
FIGS. 3A-3C show results from Example 2.

In a first simulation, the shell thickness ("b" in the graphs) was fixed at 125 nm, and the core radius ("a" in the graphs) was varied from 75 nm to 85 nm to 95 nm. The impact of the change in core radius is graphed in FIG. 3A. It was observed that the peak in the scattering cross section could be moved from blue to red by changing the core radius. In other words, the color effect could be varied by changing the size of the core.

Figure 3B:
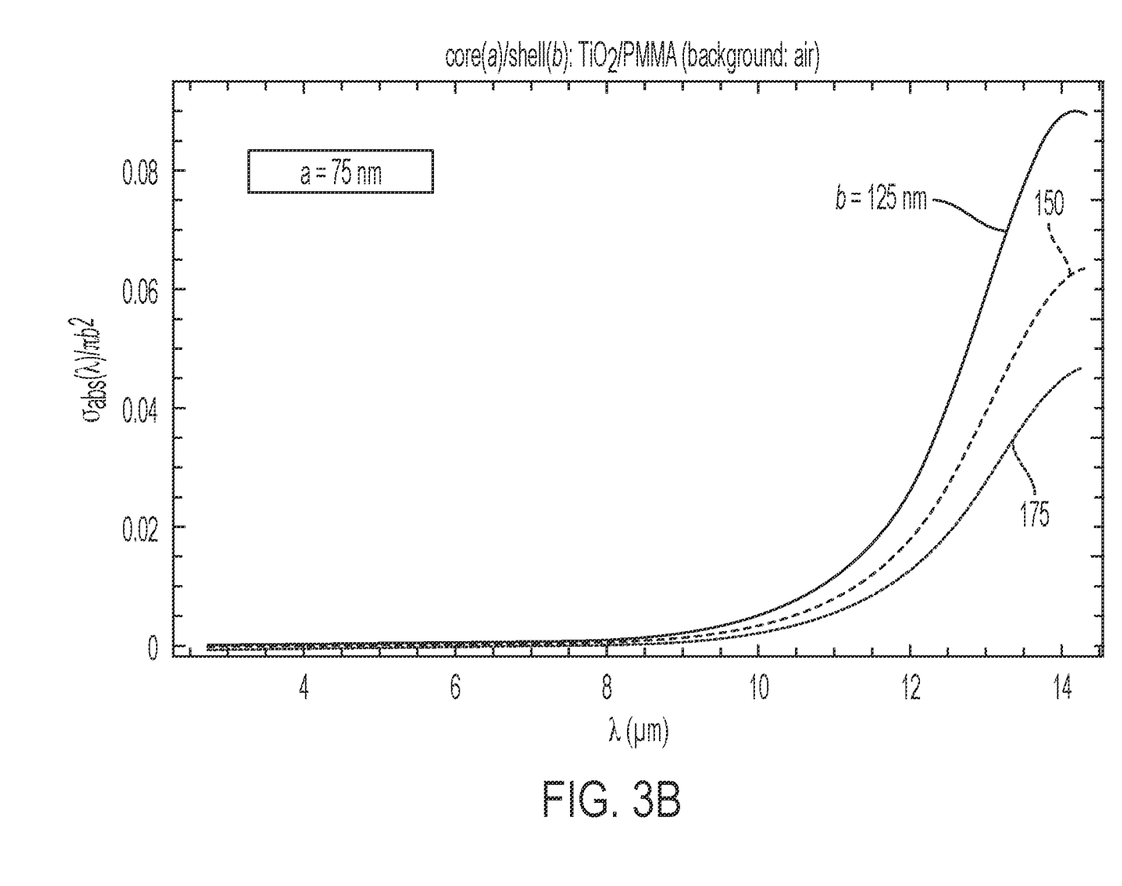
Figure 3C:
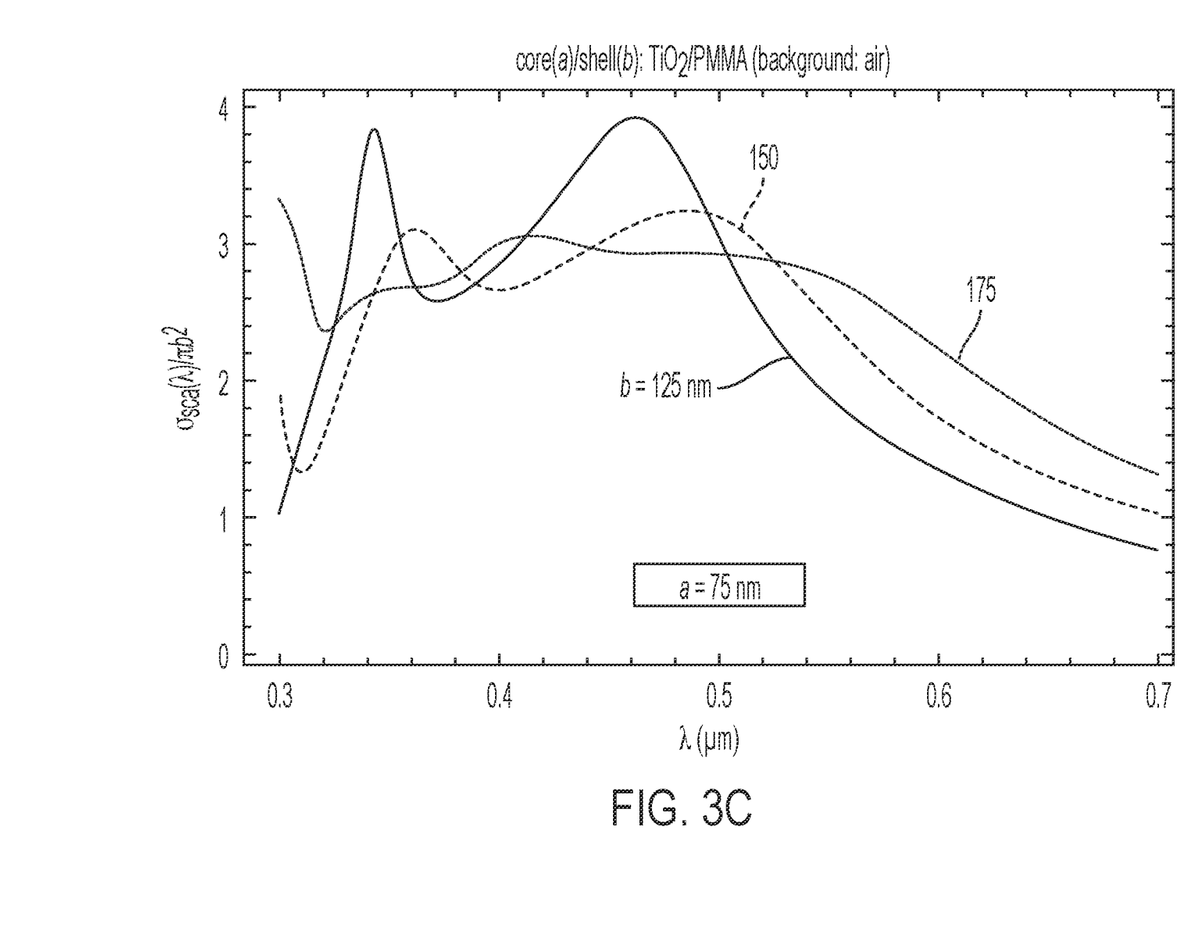

In a second simulation, the core radius was fixed at 75 nm, and the shell thickness was varied from 125 nm to 150 nm to 175 nm. The impact of the change in shell thickness on NIR absorption is graphed in FIG. 3B and on color effect in FIG. 3C. It was observed that NIR absorption could be reduced by increasing the thickness of the shell. It was further observed that increasing the shell thickness decreased color selectivity.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A particle comprising a first material forming a first portion and a second material forming a second portion surrounding or adjacent the first portion, arranged to provide a Fano resonance effect in visible portion of electromagnetic spectrum,
    wherein the second material comprises a polymer,
    wherein the first portion has a cross-sectional half dimension of 20 nm to 200 nm, and
    wherein the second portion has a cross-sectional dimension of 20 nm to 300 nm.

2. The particle of claim 1, wherein the first and second materials are substantially clear in the visible portion of the electromagnetic spectrum.

3. The particle of claim 1, wherein the particle is substantially clear in IR portion of the electromagnetic spectrum or emits only in a wavelength range of 8 μm to 13 μm and is substantially clear in other parts of the IR portion.

4. The particle of claim 1, wherein the first material comprises an inorganic material comprising $SiO_2$, $TiO_2$, $HfO_2$, $ZrO_2$, diamond, or a combination thereof.

5. The particle of claim 1, wherein the second material comprises a polymer, wherein the polymer comprises a polyacrylate, polymethylmethacrylate, polymethylacrylate, polydimethylsiloxane, poly(1,1,1,3,3,3-hexafluoroisopropyl acrylate), poly(2,2,2-trifluoroethyl methacrylate), polydimethylsiloxane, vinyl polymer, acrylate polymer, styrenic polymer, methacrylate polymer, fluoropolymer, polyethylene, polypropylene, polyacrylamide, polytetrafluoroethylene, polyvinylidene fluoride, poly(3,3,4,4,5,5,6,6,7,7,8,8,9,9,10,10,10-heptadecafluorodecyl methacrylate), polyamide, or a combination thereof, optionally wherein the polymer is grafted to or grafted from the first material.

6. The particle of claim 5, wherein the polymer has a polydispersity index of 2 or less.

7. The particle of claim 1, wherein the first material has a first refractive index and the second material has a second refractive index, and wherein the first refractive index and second refractive index have a difference of 0.5 to 1.5.

8. The particle of claim 1, wherein the first material forms a core and the second material forms a shell surrounding the core, wherein the core is spherical or substantially spherical.

9. The particle of claim 8, wherein the core has a radius of 20 nm to 200 nm, and wherein the particle has a radius of 40 nm to 500 nm.

10. The particle of claim 1, wherein the first and second materials form a Janus particle comprising a first portion made up of the first material and a second portion made up of the second material.

11. The particle of claim 10, wherein the first portion and the second portion are arranged side by side.

12. The particle of claim 1, wherein the first and second materials form a dimer particle comprising a first portion made up of the first material and a second portion made up of the second material, and wherein the first and second portions are unequal in size.

13. The particle of claim 1, wherein the Fano resonance effect exhibits a full width at half maximum of absorption ranging from 5 nm to 20 nm in a wavelength range of 400 nm to 800 nm.

14. A composition comprising a medium and a plurality of particles comprising the particle of claim 1 dispersed in the medium, wherein the particles make up less than 90% of the medium on a dry weight basis.

15. The composition of claim 14, wherein the medium is a radiative cooling paint capable of transmitting or emitting radiation in a window of 8 μm to 13 μm.

* * * * *